(12) United States Patent
Gonthier et al.

(10) Patent No.: US 7,046,875 B2
(45) Date of Patent: May 16, 2006

(54) OPTICAL COUPLER COMPRISING MULTIMODE FIBERS AND METHOD OF MAKING THE SAME

(75) Inventors: François Gonthier, Montreal (CA); Lilian Martineau, Montreal (CA); François Seguin, Montreal (CA); Alain Villeneuve, Montreal (CA); Mathieu Faucher, Montreal (CA); Nawfel Azami, Montreal (CA); Marc Garneau, Montreal (CA)

(73) Assignees: ITF Technologies Optiques Inc., Montreal (CA); ITF Optical Technologies Inc., Montreal (CA)

( * ) Notice: Subject to any disclaimer, the term of this patent is extended or adjusted under 35 U.S.C. 154(b) by 261 days.

(21) Appl. No.: 10/694,717

(22) Filed: Oct. 29, 2003

(65) Prior Publication Data
US 2005/0094952 A1 May 5, 2005

(51) Int. Cl.
*G02B 6/26* (2006.01)
*G02B 6/42* (2006.01)

(52) U.S. Cl. .......................... 385/28; 385/27; 385/43; 385/45; 385/50

(58) Field of Classification Search ................ 385/28, 385/31, 39, 42–43, 45, 48, 50; 250/227.18, 250/227.28
See application file for complete search history.

(56) References Cited

U.S. PATENT DOCUMENTS

| 4,205,901 A | | 6/1980 | Ramsay et al. | |
|---|---|---|---|---|
| 4,291,940 A | | 9/1981 | Kawasaki et al. | |
| 4,330,170 A | | 5/1982 | Johnson et al. | |
| 4,392,712 A | * | 7/1983 | Ozeki | 385/43 |
| 4,426,215 A | | 1/1984 | Murphy | |
| 4,550,974 A | | 11/1985 | Murphy | |
| 4,877,300 A | * | 10/1989 | Newhouse et al. | 385/43 |
| 4,877,304 A | * | 10/1989 | Bhagavatula | 385/124 |
| 5,355,426 A | * | 10/1994 | Daniel et al. | 385/39 |
| 5,381,503 A | | 1/1995 | Kanamori et al. | |
| 5,479,546 A | * | 12/1995 | Dumais et al. | 385/43 |
| 5,664,037 A | * | 9/1997 | Weidman | 385/46 |
| 5,761,234 A | * | 6/1998 | Craig et al. | 372/75 |
| 5,864,644 A | * | 1/1999 | DiGiovanni et al. | 385/43 |
| 6,167,075 A | * | 12/2000 | Craig et al. | 372/75 |
| 6,397,636 B1 | * | 6/2002 | DiGiovanni et al. | 65/395 |
| 6,414,262 B1 | | 7/2002 | Rao | |
| 6,434,295 B1 | * | 8/2002 | MacCormack et al. | 385/27 |

(Continued)

OTHER PUBLICATIONS

The Photonics Design and Applications Handbook 2002 Fiber Optics: Understanding the Basics (Lucent Technologies).

(Continued)

*Primary Examiner*—Frank G. Font
*Assistant Examiner*—Ryan Lepisto
(74) *Attorney, Agent, or Firm*—George J. Primak (57) ABSTRACT

An optical coupler is provided. It has a bundle of multimode fibers with a few-mode fiber in its centre. Such bundle is fused at one end which is the output end for the signal that is transmitted by the few-mode fiber. To make the coupler, this output end of the bundle is aligned and spliced with a large area core double clad fiber while preserving the modal content of the feed-through. A method for making such optical coupler is also provided. It includes the steps of bundling a central few-mode fiber with a plurality of multimode fibers and then fusing one end of such bundle and aligning it and splicing with a large core double clad fiber, while preserving fundamental mode transmission from one to the other.

20 Claims, 6 Drawing Sheets

U.S. PATENT DOCUMENTS

| | | | |
|---|---|---|---|
| 6,434,302 B1 * | 8/2002 | Fidric et al. | 385/43 |
| 6,823,117 B1 * | 11/2004 | Vakili et al. | 385/43 |
| 6,840,687 B1 * | 1/2005 | Riis et al. | 385/95 |
| 2003/0128723 A1 * | 7/2003 | Bayart et al. | 372/6 |
| 2004/0091219 A1 * | 5/2004 | Christensen et al. | 385/96 |
| 2004/0196537 A1 * | 10/2004 | Strodoumov | 359/341.3 |
| 2004/0197062 A1 * | 10/2004 | White | 385/124 |
| 2004/0247271 A1 * | 12/2004 | Skovgaard et al. | 385/125 |
| 2004/0252946 A1 * | 12/2004 | DiGiovanni et al. | 385/43 |

OTHER PUBLICATIONS

Applications Note No. M105 (Oxford Electronics Ltd.) Jun. 1, 1999.

* cited by examiner

OPTICAL COUPLER COMPRISING MULTIMODE FIBERS AND METHOD OF MAKING THE SAME

FIELD OF THE INVENTION

This invention relates generally to optical fiber couplers. More particularly, the invention pertains to optical fiber couplers for coupling a bundle of multimode fibers, containing a few-mode fiber in their centre, to a large core area double clad fiber. The invention also provides a method for making such coupler.

BACKGROUND OF THE INVENTION

Multimode optical fibers are used in a large number of applications, such as communications networks, sensors systems, avionic and aerospace industry, medical instruments, fiber bundles, and fiber amplifiers and lasers. One of the basic components in most of these applications is the multimode fiber coupler, that can take several different forms, such as the power splitter, the tap coupler, the star coupler or the power combiner. All these components essentially take several multimode fibers and bundle them together by either mechanically holding them or twisting them together, and the structure is fused and/or tapered in order to induce coupling between the fibers from the input to the output. The basic description of this coupling is given in U.S. Pat. No. 4,291,940 of Kawasaki et al. It discloses that if two multimode fibers are placed side by side and then fused together using a heat source, there is some optical power transfer from one fiber to the other. Such transfer can be increased as the structure is pulled and tapered.

This basic fused-tapered concept was used in several subsequent patents such as U.S. Pat. Nos. 4,392,712 and 4,330,170 where it became apparent that this procedure could also be used for more than two fibers, thus creating M×N fused taper bundles, where M is the input number of fibers and N is the output number of fibers. Moreover, the fuse and taper process received some further improvements such as described in U.S. Pat. Nos. 4,426,215 and 4,550,974 where several techniques are disclosed to improve the uniformity of the power distribution in the fused-tapered multimode fiber bundles. In particular, U.S. Pat. No. 4,550,974 describes a process presently known in the art as the "cut and fuse" process where a fused tapered multimode fiber bundle is cut and then fused together again to produce a better mode scrambling effect and thus better uniformity. From this process, it quickly became apparent that one did not need to fuse the same two coupler halves together, but one could put together two different coupler halves, thereby creating another way of making M×N couplers.

As applications of multimode fiber evolved, there came another application that can benefit from this process. The double clad fiber amplifiers or lasers use a type of fiber, the double clad fiber (DCF), that has a single-mode core doped with rare-earth ions, such as ytterbium, erbium or neodinium, that is surrounded by an optical cladding of far larger diameter. This cladding is a highly multimode waveguide and it is surrounded by another optical cladding having a lower refractive index, which may be a polymer cladding. To amplify an optical signal propagating through the DCF core, one needs to optically pump the rare-earth ions. This pump optical power can be injected in the core in the same manner as in single-mode fiber amplifiers, but the purpose of the double clad is that the pump power can be injected into the inner cladding which surrounds the core. Because some of the cladding modes travel through the core, they provide energy to the rare-earth ions and enable the amplification of the signal to occur. Moreover, because the inner cladding is far larger than the core, it is possible to input a greater number of pump laser light and spatially multiplex the same in the cladding, rather than wavelength or polarization multiplex the pump laser in the core. Thus, a much greater amount of pump power is available in DCF for the amplification than in single-mode fiber amplifiers.

In some DCF amplifiers or lasers, the coupling is achieved by bulk optics, coupling the pump power through lens and mirrors into the double cladding. U.S. Pat. No. 5,864,644 describes how this can be done with a multimode taper bundle using a similar approach as the "cut and fuse" technique, where the second coupler half is replaced by a DCF. The patent also describes how it is possible to include in the bundle s single-mode fiber, that will connect to the single-mode core of the DCF, thus allowing a signal to go through the coupler and be amplified or reversely, if the coupler is used in a counter pump configuration (i.e. the pump power and the signal go in the opposite direction), to let the signal out of the amplifier with minimum loss. A modification to this structure is disclosed in U.S. Pat. No. 6,434,302, where it is stated that for better performance, the tapered bundle and DCF structure must be tapered further than the diameter of the DCF to improve mode distribution for improved gain efficiency.

In high power amplifiers and lasers, as the power available for pump is greater, the power output of the amplifier or laser is also larger, to the point where the light intensity in the doped glass becomes large enough to damage the glass or to produce undesirable non-linear effects, such as Raman or Brilloin scattering. Thus, a new generation of DCF fibers has been developed to address these high power situations. These fibers have a large core area so that, even if the power is high, the intensity in the core remains reasonable. Even if one decreases the index step of the core waveguide, the large core is not necessarily single-mode at the laser wavelength. The fiber core is few-moded. One must carefully excite the core fundamental mode to have the amplification in that mode, that will produce the best output beam. This problem is not addressed in U.S. Pat. Nos. 5,864,644 and 6,434,302 which deal only with a single-mode connection. A single-mode connection is simple because one cannot excite anything other than the fundamental mode in the connection, even if the splice between the tapered fiber bundle and the DCF is bad. In the few-mode case, this connection is crucial to the proper functioning of the amplifier.

Thus, there is a need for a coupler that provides a connection of a bundle of multimode pump fibers that have a few-mode signal fiber in their centre, to a large area core double clad fiber (LACDCF).

OBJECTS AND SUMMARY OF THE INVENTION

It is an object of the present invention to provide an optical coupler with a fused fiber bundle of multimode fibers having a few-mode fiber in their centre, to be connected to LACDCF.

Another object of the present invention is to provide an input end fused fiber periphery or fiber bundle transverse geometry that would preserve the modal content of the few-mode core in such coupler.

A still further object of the present invention is to provide a method of making a coupler with the above mentioned properties, including alignment and splicing of the fiber bundle to the LACDCF.

Other objects and advantages of the invention will become apparent from the following description thereof.

As is known, a single-mode fiber normally has a mode field diameter of up to 9 µm, whereas a few-mode fiber usually has a mode field diameter of 30–50 µm, while multimode fibers generally have a core mode field diameter above 50 µm. Also, in the LACDCFs the core has a mode field diameter which is similar to that of the core of the few-mode fiber.

In a single-mode connection, one deals with two cores that have the same mode field diameter, because at one point in the tapering process, the mode field diameter increases rather than decreasing. One can thus, by tapering a bundle of fibers that include a single-mode fiber, match the mode field of the single-mode core of the tapered bundle to the mode of the DCF single-mode core, as disclosed, for instance, in U.S. Pat. No. 6,434,302. This, however, is not possible to achieve with a few-mode fiber, unless one tapers the bundle to the point where the two fiber core becomes single-mode. Thus, the basic difference in connecting the LACDCF to a bundle with a few-mode fiber is that the signal transmitting the few-mode fiber cannot simply be tapered to achieve the connection (as in the case of single-mode fibers), and must be made to match the modal content of the LACDCF.

Thus, in essence, according to the present invention, there is provided an optical coupler which comprises:

(a) a bundle of a plurality of multimode fibers having a few-mode fiber in the centre, said few-mode fiber being a signal fiber through which an optical signal is transmitted;

(b) a large area core double clad fiber (LACDCF) having an inner cladding and an outer cladding with a lower refractive index, which outer cladding may be made of a polymer, said LACDCF having an end portion from which the outer cladding is removed if it is made of a polymer, said end portion terminating with an input end the inner cladding of which has a predetermined circumference, into which input end of the LACDCF the optical signal is to be transmitted;

(c) said bundle having a fused end portion with an output end having a periphery that fits within the circumference of the inner cladding of the input end of the LACDCF; and (d) said output end of the bundle being aligned and spliced with the input end of the LACDCF in such a way as to preserve fundamental mode transmission from the few-mode fiber to the LACDCF.

The multimode fibers of the bundle end portion may also be tapered before being fused in order to fit within the circumference of the inner cladding of the input end of the LACDCF.

The method of the present invention essentially comprises:

(a) bundling a central few-mode fiber with a plurality of surrounding multimode fibers so that the surrounding multimode fibers are placed generally symmetrically around the central few-mode fiber, thereby forming a bundle of said fibers having an output end;

(b) providing a large area core double clad fiber (LACDCF) and if it has an outer polymer cladding, removing said outer polymer cladding from an end portion thereof, said end portion terminating with an input end of the LACDCF having an inner cladding of a given circumference;

(c) fusing the output end of the bundle so that its periphery fits within the circumference of the inner cladding of the input end of the LACDCF; and (d) splicing the fused output end of the bundle to the input end of the LACDCF in such a manner that the core of the few-mode fiber is precisely modally aligned with the core of the LACDCF so as to preserve fundamental mode transmission from the few-mode fiber to the LACDCF.

The multimode fibers at the output end of the bundle may also be tapered prior to being fused, so as to fit within the circumference of the inner cladding of the input end of the LACDCF.

BRIEF DESCRIPTION OF THE DRAWINGS

The invention will now be described with reference to the appended drawings, in which.

DETAILED DESCRIPTION OF THE INVENTION

Preferred embodiments of the invention will now be described with reference to the appended drawings in which the same parts are designated by the same reference numbers.

Figure 1:
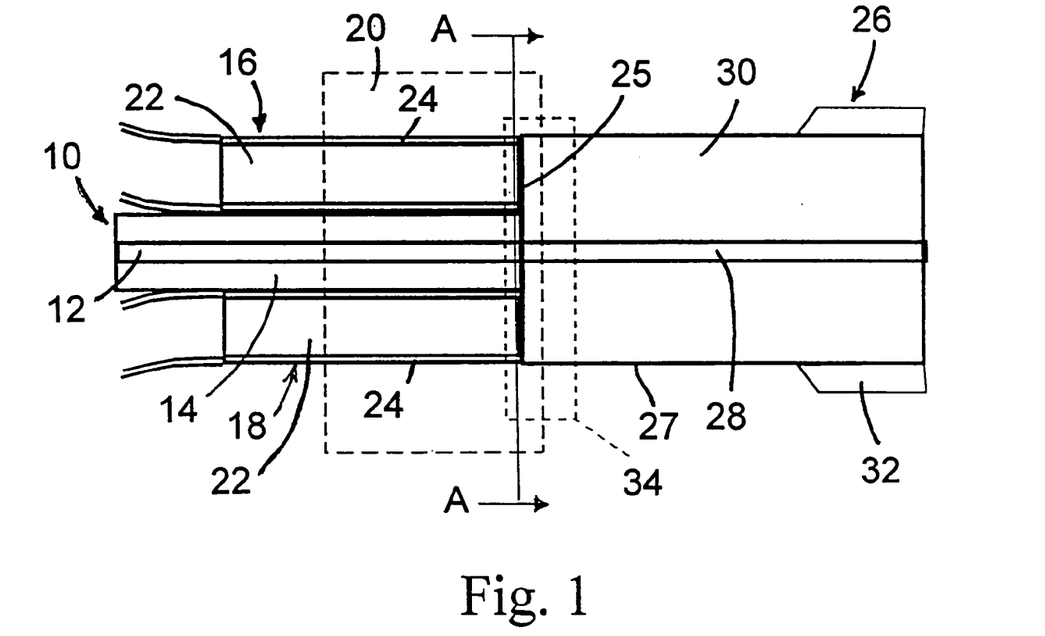
FIG. 1 is a schematic side view representation of a coupler arrangement in accordance with the present invention in which a bundle of three fibers comprising two multimode fibers and a few-mode fiber in the centre is connected to the LACDCF.

In the embodiment shown in FIG. 1, a few-mode fiber 10 is provided, having a core 12 of 50 µm diameter and a cladding 14 of 125 µm diameter. This few-mode fiber 10 is bundled with two multimode fibers 16, 18 and the bundle is fused in the fusion region 20. The multi-mode fibers 16, 18 each have a core 22 of 105 µm diameter and a cladding 24 of 125 µm diameter. The three fibers total 375 µm in their longitudinal periphery before fusion and 350 µm after fusion. The fused end of this structure was then cleaved, aligned and spliced to the end 25 of the LACDCF 26 having a large area core 28 of 50 µm diameter and an inner cladding 30 of 350 µm diameter. The second outer polymer cladding 32 was stripped from the end portion 27 of the LACDCF prior to splicing in the splicing region 34. The polymer cladding is stripped so that it would not burn during splicing. However, if a non-polymeric outer cladding is used, it does not need to be stripped from the inner cladding near the splicing region. Once the coupler is thus made, it is normally packaged by bonding it to a suitable substrate to preserve the alignment of the components.

Figure 2:
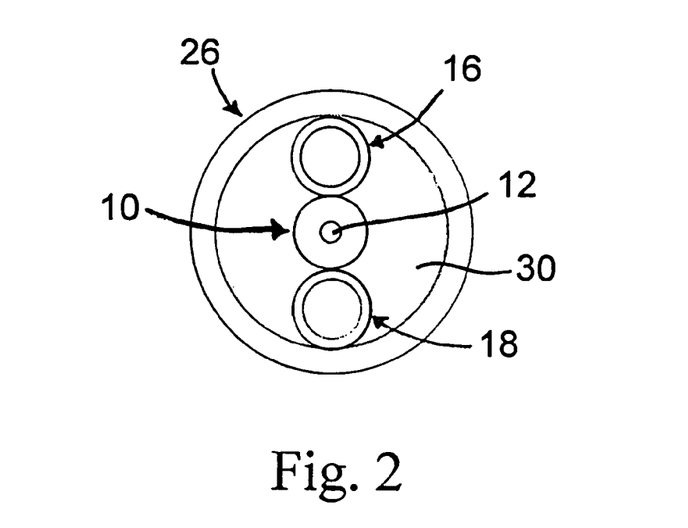
FIG. 2 is a section view of the splicing region of FIG. 1 along line A—A.

FIG. 2 illustrates a transverse section view of the coupler arrangement of FIG. 1 along line A—A, namely essentially at the splicing position. The few-mode fiber 10 having its core 12 bundled and fused with multimode fibers 16 and 18, is aligned and spliced with the LACDCF 26 having a large area core 28 (shown in FIG. 1) that corresponds to core 12 in its modal content. When splicing the fused bundle of fibers 10, 16 and 18 with the LACDCF fiber 26, the periphery of the bundle is adapted to fit within the circumference of the inner cladding 30 of the LACDCF and, if necessary, should be tapered to achieve such size. This periphery does not need to cover the entire surface of end 25 of the inner cladding 30 of the LACDCF, but what is important is that the bundle and the few-mode fiber be so aligned with the LACDCF as to preserve the fundamental mode transmission from the few-mode fiber to the LACDCF. Essentially, this means that the core 12 should be precisely modally aligned with the large area core 28. This can be done by launching the fundamental mode of the few-mode fiber and monitoring the modal content at the input of the LACDCF with a near-field measurement device, such as a camera that images the fiber endface through an appropriate lens. One then aligns the bundle and the LACDCF until a Gaussian mode field is obtained. The splice is then made and the modal field is checked again to verify that the modal content does not change. If the modal content has changed or was lost because of the splice, this may be due to stresses in the splice. The splice then needs to be reheated and reworked to optimize the modal content. When monitoring the modes, the LACDCF fiber should be straight or under a small amount of tension to prevent mode coupling that would effect the measurement. Such measurement should also be done at the wavelength of the operation or at a wavelength very close to it in order to produce best results.

Figure 3:
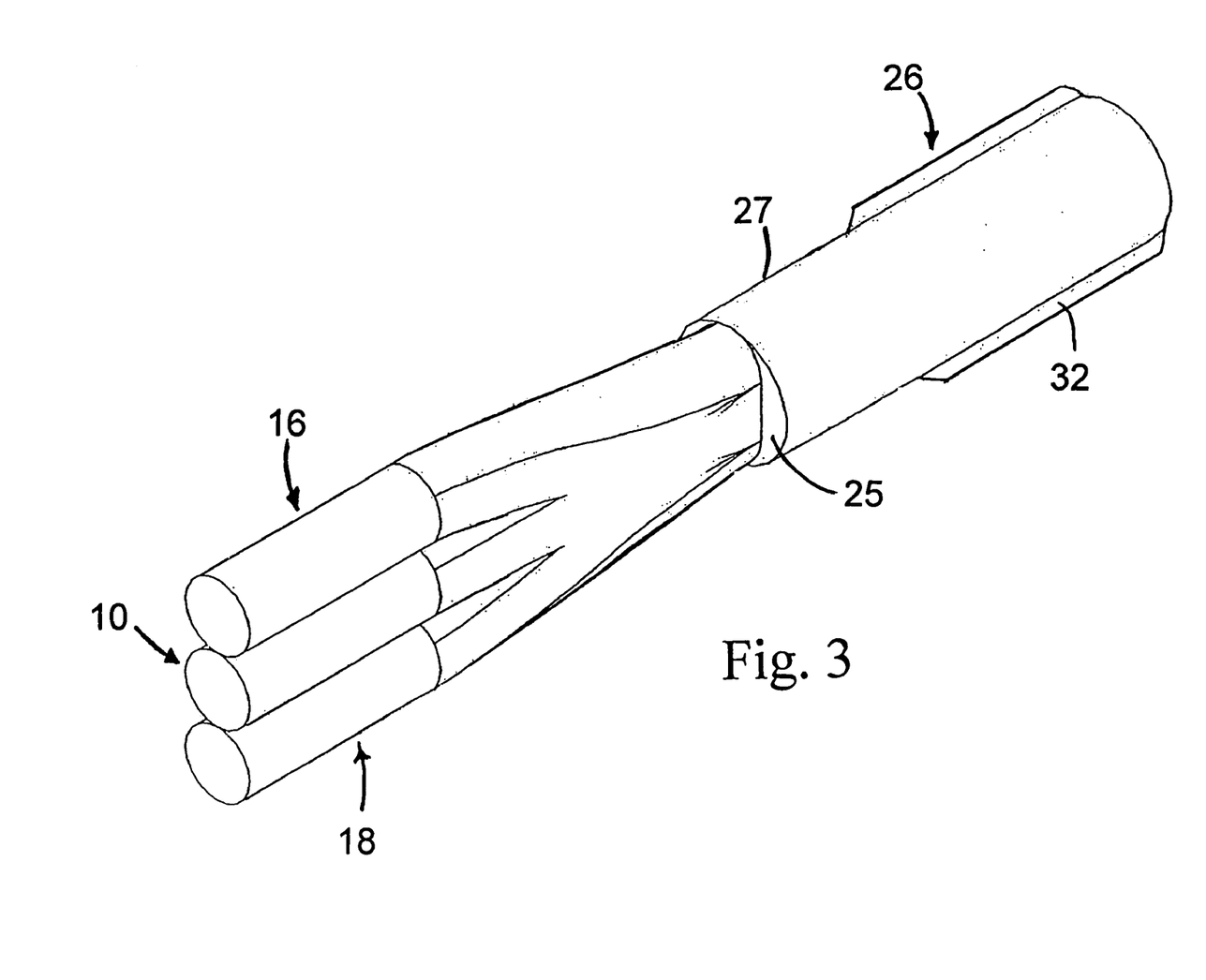
FIG. 3 is a perspective view of the coupler shown in FIG. 1.

FIG. 3, which represents a perspective view of the coupler of the present invention, shows that the few-mode fiber 10 is positioned in the middle between multi-mode fibers 16 and 18 and is fused and spliced at the splicing end 25 with the LACDCF fiber 26. Near the splicing end 25, namely at the end portion 27, the polymer outer cladding 32 has been removed, so that the splicing is done within the circumference of the inner cladding of the LACDCF 26. The splicing would still be done within the circumference of the inner cladding of the LACDCF 26, even if a non-polymeric outer cladding were used, however, such outer cladding need not be removed from the end portion 27.

It is also possible to use any suitable number of multimode fibers 16, 18 . . . N, bundled around the few-mode fiber 10. Thus, for example, one can place six multimode fibers having a diameter of 125 µm around a few mode fiber 10 also having a diameter of 125 µm. These fibers would be fused within the fusion region 20 to fit within the circumference of the inner cladding 30 of the LACDCF, and spliced within the splicing region 34 at end 25 to the LACDCF fiber 26 while preserving fundamental mode transmission from the few-mode fiber 10 to the LACDCF 26. As already described previously, this is achieved with proper modal alignment of the cores 12 and 28.

Figure 4:
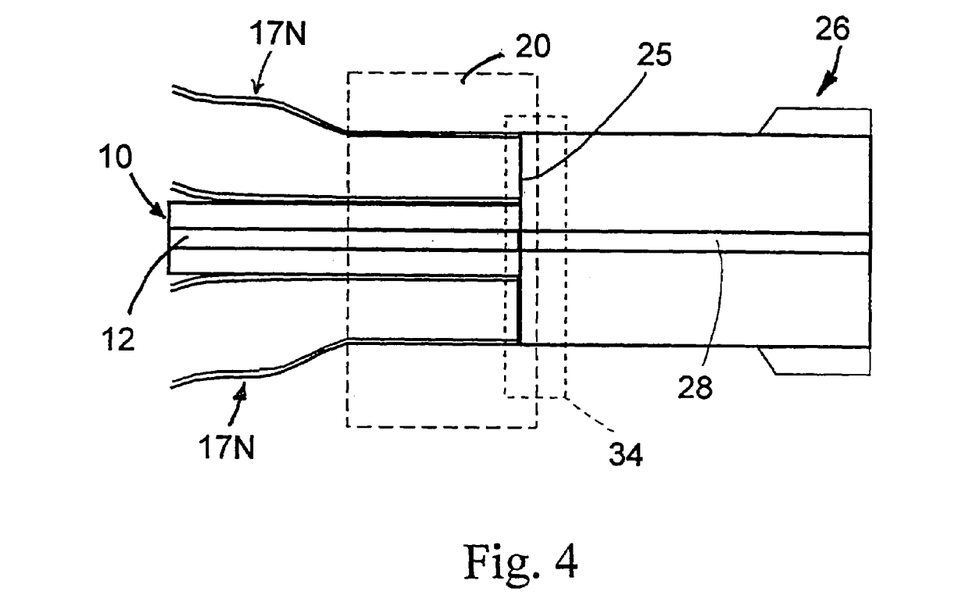
FIG. 4 is a schematic side view representation of a coupler in accordance with the present invention in which a bundle of more than two multimode fibers with a few-mode fiber in the centre is connected to the LACDCF.

In another embodiment, illustrated in FIG. 4, one can use, for example, seven multimode fibers 17N having a diameter of 220 µm, bundled around a 125 µm few-mode fiber 10. The fibers 17N are tapered to 125 µm diameter before fusing them in the fusion region 20. They are then spliced to the LACDCF fiber 26 in the splicing region 34 at end 25 of the LACDCF, after alignment to preserve the modal content of the feed-trough.

In general, when tapering the outer multimode fibers, one should not taper them more than the ratio:

$$R=\rho_o/\rho_i=NA_{MM}/NA_{DCF}$$

where R is the maximum taper radio
$\rho_o$ is the final diameter of the multimode fiber
$\rho_i$ is the initial diameter of the multimode fiber
$NA_{MM}$ is the numerical aperture of the multimode fiber
$NA_{DCF}$ is the numerical aperture of the LACDCF inner cladding waveguide.

When tapering the outer multimode fibers, one can have any suitable number of such fibers bundled and then fused around a few-mode fiber, provided the above taper ratio is maintained. Some such bundle configurations are shown in FIGS. 8A to 8L discussed below.

Figure 5:
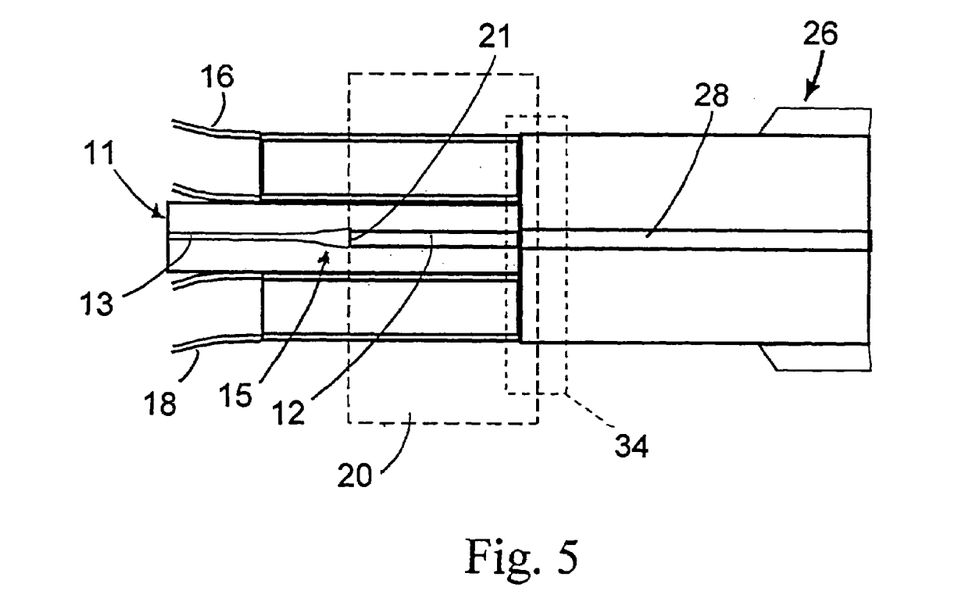
FIG. 5 is a schematic side view representation of an embodiment of the present invention where the core of a single-mode fiber has been expanded and connected to a core of a few-mode fiber before splicing with the LACDCF.
Figure 6:
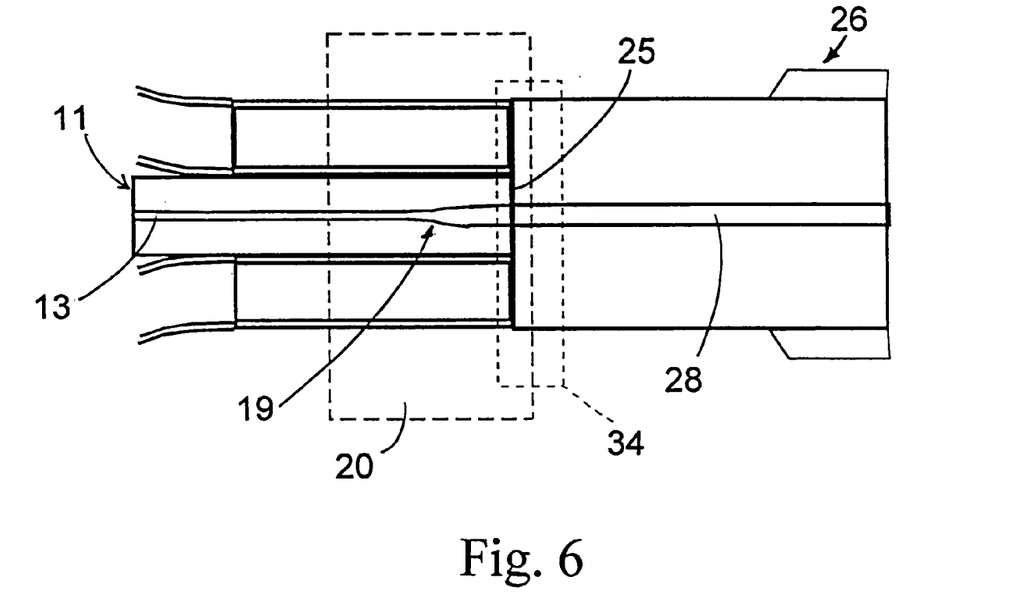
FIG. 6 is a schematic side view representation of another embodiment in which the core of a single-mode fiber has been expanded to a few-mode fiber level just before splicing with the LACDCF.
Figure 7:
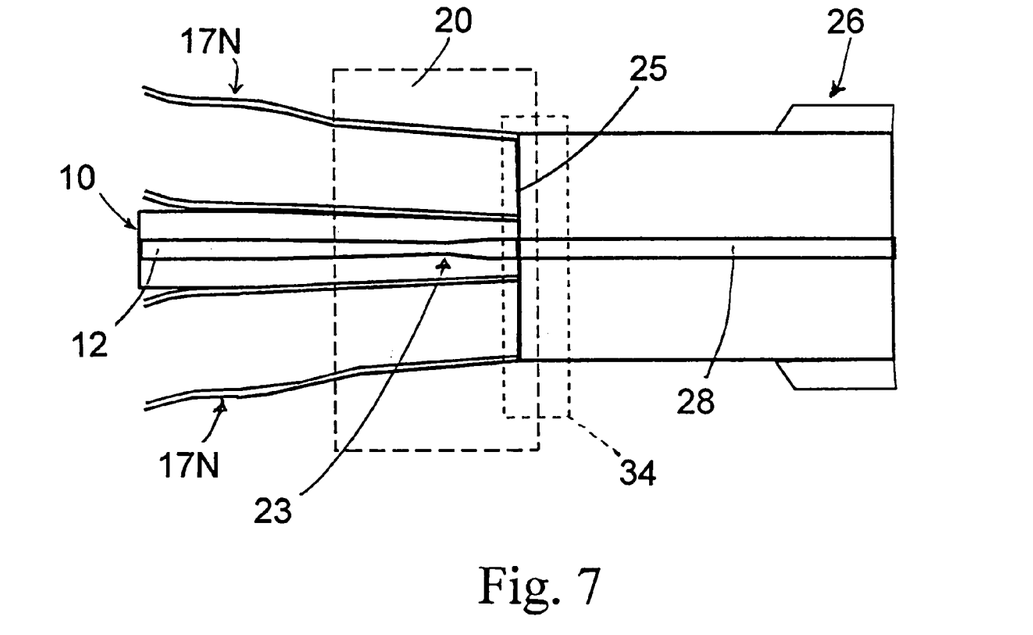
FIG. 7 is a schematic side view representation of an embodiment where the core of the few-mode fiber has been expanded prior to bundling and then fused and tapered within the bundle fusion region to the appropriate mode size before splicing with the LACDCF.

Further embodiments of the invention as illustrated in FIGS. 5, 6 and 7 relate to the adjustment of the mode field diameter of the signal fiber to the large area core of the double clad fiber.

Thus, in FIG. 5 the invention provides an adjustment of the mode field diameter of the signal fiber 11, which is a single-mode fiber having a 6 µm core 13, to the LACDCF fiber 26 having a 50 µm core 28. This is done by providing a mode converter to increase the size of the core as shown at 15 and splice it to a length of a few mode fiber at 21 so as to connect it with the 50 µm core 12 of the few-mode fiber provided within the fusion region 20. Then, the few-mode fiber is fused in the fusion region 20 with the multimode fibers 16, 18 and spliced with the LACDCF 26 in the splicing region 34 as already described previously, so that cores 12 and 28 are coupled to preserve the fundamental mode transmission from the few mode fiber to the LACDCF.

In another embodiment illustrated in FIG. 6, rather than using a mode converter to expand and splice a single-mode fiber to a length of a few-mode fiber, one can provide a mode converter to diffuse the core 13 of a single mode fiber 11 at 19 so that the core 13 is diffused within the fusion region 20 near the splicing surface 25, whereby the fiber 11 becomes few-moded over a few centimeters leading to the splicing region 34, where the fiber is aligned and spliced with the LACDCF 26. The core 13 is diffused at 19 to become a 50 µm core that can be aligned and spliced with core 28 of the LACDCF 26 as described previously. This configuration is similar to that shown in FIG. 5, except there is no transitional few-mode fiber provided in the bundle.

The embodiment illustrated in FIG. 7 provides for an expansion of the core 12 of the few-mode fiber 10 that has been narrowed while tapering the fibers 17N around it, as disclosed with reference to FIG. 4. This may happen in some cases due to a particular design of the bundle where one must taper the few-mode fiber because the diameter of the fused bundle is larger than the diameter of the internal cladding of the LACDCF, and one could not taper the outer multi-mode fibers more because of the relation of the numerical apertures as expressed in the ratio R above. In such as case, one can expand the core 12 of the few-mode fiber 10 using the mode converter referred to above, for example at location 23 within the fusion region 20, and leading to the splicing region 34. This expansion is done so that the core of the few-mode fiber at the splicing surface 25 will match core 28 of the LACDCF 26 and produce the required modal content of the feed-through. It is important to note that when additional tapering is done, the total tapering of the pump fibers should not exceed the R ratio referred to above. Any tapering in excess of that ratio will cause extra loss.

The mode converter mentioned above with reference to FIGS. 5, 6 and 7 is usually produced by heating the fiber to a high temperature such that the germanium, which is present as a dopant in the fiber core, diffuses into the cladding, thereby increasing the size of the core and thus of the mode. At one point of such diffusion process, the mode field diameter of the expanded core becomes equal to that of the large area core of the DCF and at this point the heating is stopped and the mode conversion is completed.

In the various bundles and particularly in the tapered bundles, it is important to respect the symmetry around the few-mode fiber as much as possible, so that the fusion process does not asymmetrically deform the core of the few-mode fiber, which would make it difficult to produce a good splice. However, if the number of fibers is large, for example greater than 19, one does not need to be too careful in preserving the symmetry of the structure so long as the signal fiber remains essentially in the center of the fiber bundle. The deformation of the core will be negligible, even with high fusion and tapering of the outer multimode fibers.

FIGS. 8A to 8L illustrate different fiber configurations that can be used in accordance with the present invention within bundles to be coupled with LACDCF. It should be noted that these configurations are not limitative.

Figure 8A:
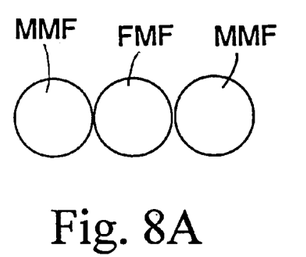
FIGS. 8A to 8L represent a schematic view of different fiber bundle configurations that may be used within the scope of the present invention.

Thus, FIG. 8A shows a configuration of 3×1 or (2+1)×1, such as already described with reference to FIGS. 1, 2 and 3, namely where three fibers are coupled with one LACDCF. In this case, the middle signal fiber FMF is a few-mode fiber and the two outer pump fibers MMF are multimode fibers.

Figure 8B:
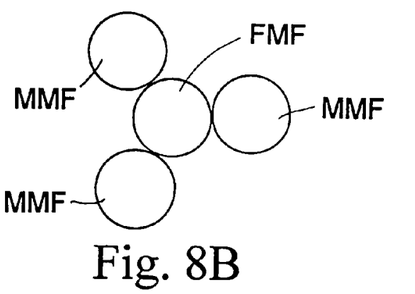

FIG. 8B illustrates a 4×1 or (3+1)×1 configuration, again with the FMF in the middle and three MMF surrounding it in symmetrical manner.

Figure 8C:
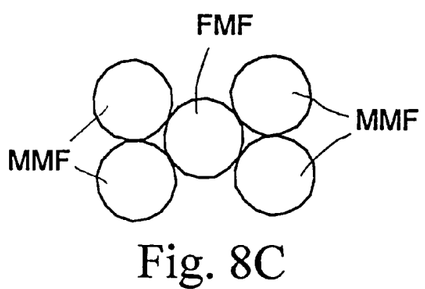
Figure 8D:
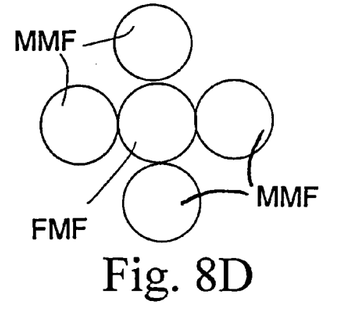

FIGS. 8C and 8D illustrate two symmetrical configurations of 5×1 or (4+1)×1 bundles that can be used in accordance with this invention. The FMF is located in the middle and is symmetrically surrounded by MMF fibers.

Figure 8E:
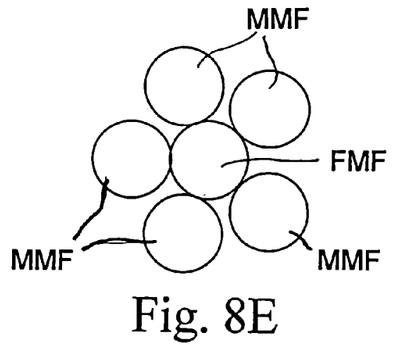
Figure 8F:
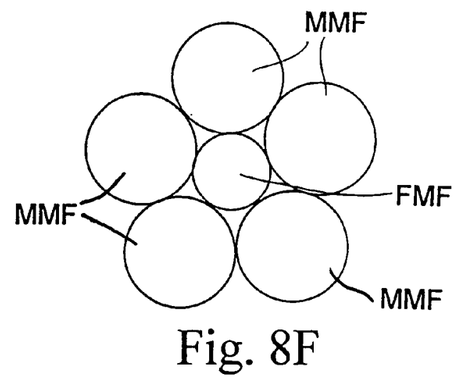

FIGS. 8E and 8F show two 6×1 or (5+1)×1 configurations. In FIG. 8E the FMF is surrounded by 5 MMF fibers of same diameter and in FIG. 8F the central FMF is surrounded by 5 larger MMF pump fibers.

Figure 8G:
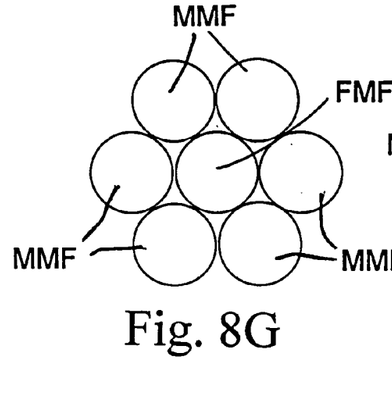

FIG. 8G shows a 7×1 or (6+1)×1 configuration where the central FMF is surrounded by 6 MMF pump fibers of same size.

Figure 8H:
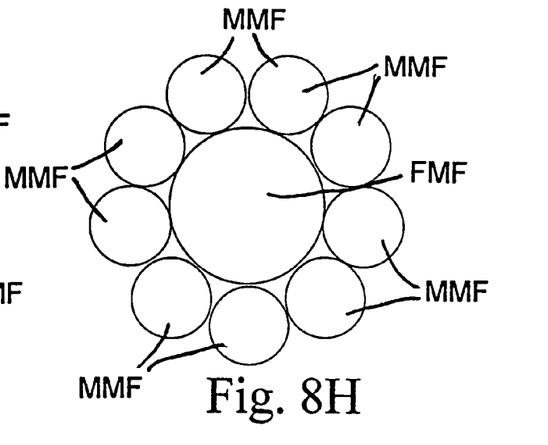

FIG. 8H illustrates a (9+1)×1 configuration where the central FMF is significantly larger than the 9 surrounding MMF pump fibers.

Figure 8I:
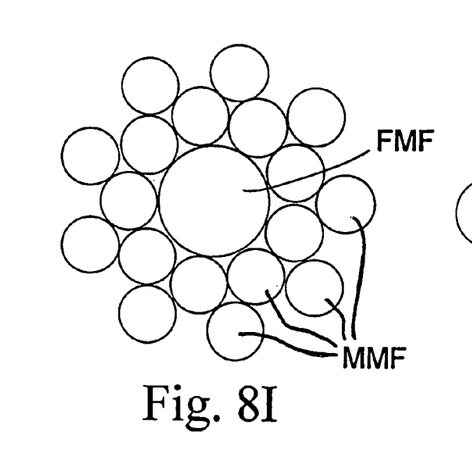

FIG. 8I shows a configuration of (18+1)×1 where the central FMF is larger than the 18 surrounding MMF pump fibers. In this case, only a few of the surrounding fibers have been identified as MMF fibers, but all of them can be MMF fibers, although if not all ports are needed, some of them can be replaced by dummy fibers, namely pure silica coreless fibers.

Figure 8J:
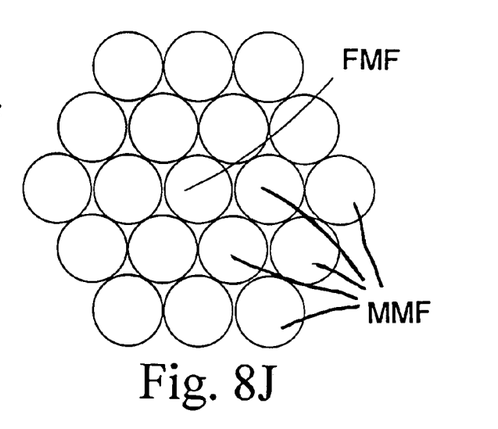

FIG. 8J illustrates a 19×1 or (18+1)×1 configuration where the central FMF is surrounded by 18 MMF fibers of same size. Again, if some of the MMF ports are not needed, they can be replaced by dummy fibers and this applies to all configurations.

Figure 8K:
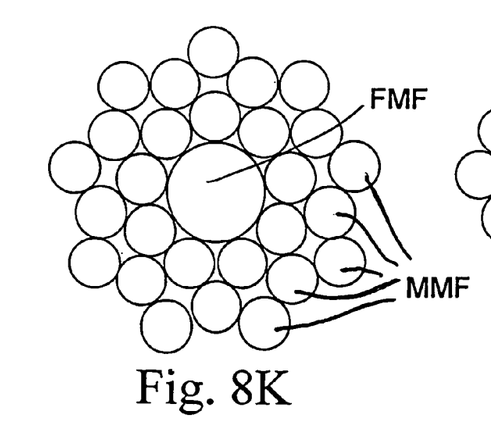

FIG. 8K shows a 19×1 or (18+1)×1 configuration where a large diameter FMF is surrounded by 18 MMF pump fibers.

Figure 8L:
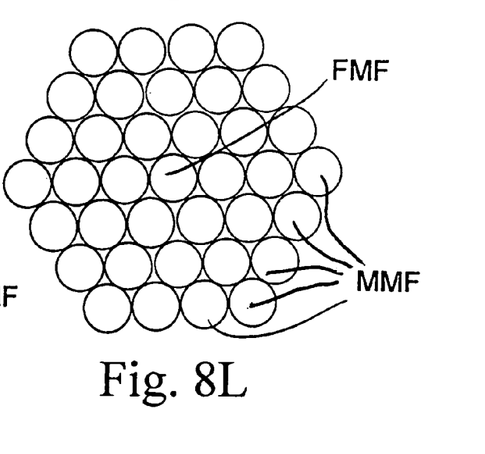

Finally, FIG. 8L illustrates a 37×1 or (36+1)×1 configuration where a central FMF is surrounded by 36 MMF pump fibers of same diameter.

By way of example, for a reduction of the pump fibers by a factor of 2, namely reducing 125 μm diameter pump fibers to 65 μm, one can place 9 fibers around the 125 μm signal fiber as illustrated in FIG. 8H. One can also add another layer of the pump fibers to form a configuration of 18 pump fibers around one signal fiber as shown in FIG. 8I. One can further add an additional layer of pump fibers to produce 27 pump fibers surrounding a signal fiber as shown in FIG. 8K. With 27 pump fibers, the configuration fits within a 400 μm diameter LACDCF.

In a further example, if the pump fibers are 220 μm in diameter with 0.22 numerical aperture, one can reduce them to 125 μm diameter and bundle them around a 125 μm central signal fiber. This can produce configurations where all fibers are of equal size as illustrated in FIGS. 8A, 8B, 8C, 8D, 8E, 8G, 8J and 8L. The configurations of 7×1 shown in FIG. 8G, 19×1 shown in FIG. 8J and 37×1 shown in FIG. 8L are close-pack configurations, meaning that there is essentially no space left between the fibers.

It should be noted that the invention is not limited to the specific embodiments described above, but that various modifications obvious to those skilled in the art may be made without departing from the invention and the scope of the following claims.

The invention claimed is:

1. An optical coupler which comprises:
   (a) a bundle of a plurality of multimode fibers having a few-mode fiber in the center, said few-mode fiber being a signal fiber through which an optical signal is transmitted;
   (b) a large area core double clad fiber (LACDCF) having an inner cladding and an outer cladding with a lower refractive index, and having an end portion terminating with an input end the inner cladding of which has a predetermined circumference, into said input end of the LACDCF the optical signal is to be transmitted from said few-mode fiber;
   (c) said bundle having a fused end portion with an output end having a periphery that fits within the circumference of the inner cladding of the input end of the LACDCF; and
   (d) said output end of the bundle being aligned and spliced with the input end of the LACDCF in such a way as to preserve fundamental mode transmission from the few-mode fiber to the LACDCF.

2. An optical coupler according to claim 1, in which the outer cladding of the LACDCF is a polymer cladding and said polymer outer cladding is removed from the end portion of the LACDCF.

3. An optical coupler according to claim 1, in which the multimode fibers are tapered before being fused at the output end, in order to fit within the circumference of the inner cladding of the input end of the LACDCF.

4. An optical coupler according to claim 3, in which the multimode fibers are tapered and fused in such a way as not to affect the fundamental mode transmission in the core of the few-mode fiber.

5. An optical coupler according to claim 3, in which the tapering of the multimode fibers reduces the core of the few-mode fiber to the fundamental mode size near the output end of the bundle, when said core bad been expanded prior to bundling.

6. An optical coupler according to claim 1, in which the few-mode fiber at the output end is a fiber with a core expanded from a single mode fiber.

7. An optical coupler according to claim 1, in which the plurality of multimode fibers is placed essentially symmetrically around the few-mode fiber within the bundle.

8. An optical coupler according to claim 1, in which at least one of the plurality of multimode fibers in the bundle is replaced by a dummy fiber.

9. A method of forming an optical coupler, which comprises;
(a) bundling a central few-mode fiber with a plurality of surrounding multimode fibers so that the surrounding multimode fibers are positioned essentially symmetrically around the central few-mode fiber, thereby forming a bundle of said fibers having an output end;
(b) providing a large area core double clad fiber (LACDCF) having an inner cladding and an outer cladding with a lower refractive index, and having an end portion terminating with an input end where the inner cladding of the LACDCF has a given circumference;
(c) fusing the output end of the bundle so that its periphery fits within the circumference of the inner cladding of the input end of the LACDCF; and
(d) splicing the fused output end of the bundle to the input end of the LACDCF in such a manner that the core of the few-mode fiber is precisely modally aligned with the core of the LACDCF so as to preserve fundamental mode transmission from the few-mode fiber to the LACDCF.

10. Method according to claim 9, in which the outer cladding of the LACDCF is a polymer cladding and the method includes removing said polymer outer cladding from the end portion of the LACDCF prior to splicing.

11. Method according to claim 9, in which the multimode fibers at the output end of the bundle are tapered prior to being fused.

12. Method according to claim 11, in which the tapering is done according to the following maximum taper ratio:

$$R = \rho_o/\rho_i = NA_{MM}/NA_{DCF}$$

where R is the maximum taper radio
  $\rho_o$ is the final diameter of the multimode fiber
  $\rho_i$ is the initial diameter of the multimode fiber
  $NA_{MM}$ is the numerical aperture of the multimode fiber
  $NA_{DCF}$ is the numerical aperture of the LACDCF inner cladding waveguide.

13. Method according to claim 11, in which the tapering of the multimode fibers followed by fusing of the bundle in done so as not to affect the modal size of the core of the few-mode fiber.

14. Method according to claim 11, in which the tapering of the multimode fibers followed by fusing of the bundle decreases the modal size of the core of the few-mode fiber, when said core had been expanded prior to bundling.

15. Method according to claim 9, in which the few-mode fiber has a core near the output end of the bundle, which is expanded from an initial single-mode fiber core.

16. Method according to claim 15, in which the expansion is done by means of a mode converter to increase the size of the core.

17. Method according to claim 15, in which the expansion is done by beating to a high temperature such that germanium present in the core diffuses into the cladding, thereby increasing the size of the core and of the mode.

18. Method according to claim 9, in which the cores of the few-mode fiber and of the LACDCF are precisely modally aligned by launching the fundamental mode of the few-mode fiber while monitoring the modal content at the input end of the LACDCF by means of a near field measurement device and aligning the output end of the bundle and the input end of the LACDCF unit a Gaussian mode field is obtained.

19. Method according to claim 18, in which the LACDCF is kept straight or under a small tension, when monitoring the modes by the near field measurement device, and the measurement is done at or near operational wavelength.

20. Method according to claim 19, in which the coupler is packaged by bonding it to a suitable substrate to preserve the alignment of the components.

* * * * *